(12) United States Patent
Murdter

(10) Patent No.: US 8,232,483 B2
(45) Date of Patent: Jul. 31, 2012

(54) METHOD AND APPARATUS FOR WEIGHING A BAG WHEREIN THE BAG IS HELD OPEN BY A LOAD SUSPENSION PART SUCH THAT AN IMAGING BEAM DIRECTED AT THE GOODS IS UNOBSTRUCTED BY THE BAG WHILE IT IS BEING GRIPPED

(75) Inventor: Herbert Murdter, Albstadt (DE)

(73) Assignee: Mettler-Toledo (Albstadt) GmbH, Albstadt (DE)

( * ) Notice: Subject to any disclaimer, the term of this patent is extended or adjusted under 35 U.S.C. 154(b) by 272 days.

(21) Appl. No.: 12/373,885

(22) PCT Filed: Mar. 31, 2008

(86) PCT No.: PCT/EP2008/002554
§ 371 (c)(1),
(2), (4) Date: Sep. 22, 2009

(87) PCT Pub. No.: WO2008/148437
PCT Pub. Date: Dec. 11, 2008

(65) Prior Publication Data
US 2012/0006599 A1      Jan. 12, 2012

(30) Foreign Application Priority Data
Jun. 1, 2007   (DE) .......................... 10 2007 025 581

(51) Int. Cl.
*G01G 19/14*   (2006.01)
*G01G 3/00*    (2006.01)

(52) U.S. Cl. .............. 177/160; 53/416; 53/417; 53/469; 53/502; 235/383

(58) Field of Classification Search ................. 177/160; 53/502, 416, 417, 469; 348/143; 235/383
See application file for complete search history.

(56) References Cited

U.S. PATENT DOCUMENTS

| | | | |
|---|---|---|---|
| 598,440 A * | 2/1898 | Raymond | 53/138.7 |
| 2,787,102 A | 4/1957 | Krueger | |
| 4,909,356 A * | 3/1990 | Rimondi et al. | 186/61 |
| 4,928,473 A * | 5/1990 | Nagao et al. | 53/53 |
| 5,125,465 A | 6/1992 | Schneider | |
| 5,313,766 A * | 5/1994 | Rimondi et al. | 53/451 |
| 6,035,606 A * | 3/2000 | Bussey et al. | 53/138.4 |
| 6,073,667 A * | 6/2000 | Graffin | 141/372 |
| 6,452,118 B1 * | 9/2002 | van Pinxteren et al. | 177/145 |

(Continued)

FOREIGN PATENT DOCUMENTS

EP          087310 A          8/1983

(Continued)

*Primary Examiner* — Randy W Gibson
(74) *Attorney, Agent, or Firm* — Schwabe, Williamson & Wyatt, P.C.

(57) ABSTRACT

A method and a device for weighing weighable goods placed in a bag (24) having a filling opening (25) are characterized according to this invention in that the bag (24) is hung from a load suspension part (13) with an area of the bag adjacent to the filling opening (25) and the weight force corresponding to the weighable goods is transferred from here to a load cell (4) which forms a corresponding weight value.

41 Claims, 14 Drawing Sheets

U.S. PATENT DOCUMENTS

Figure 1:
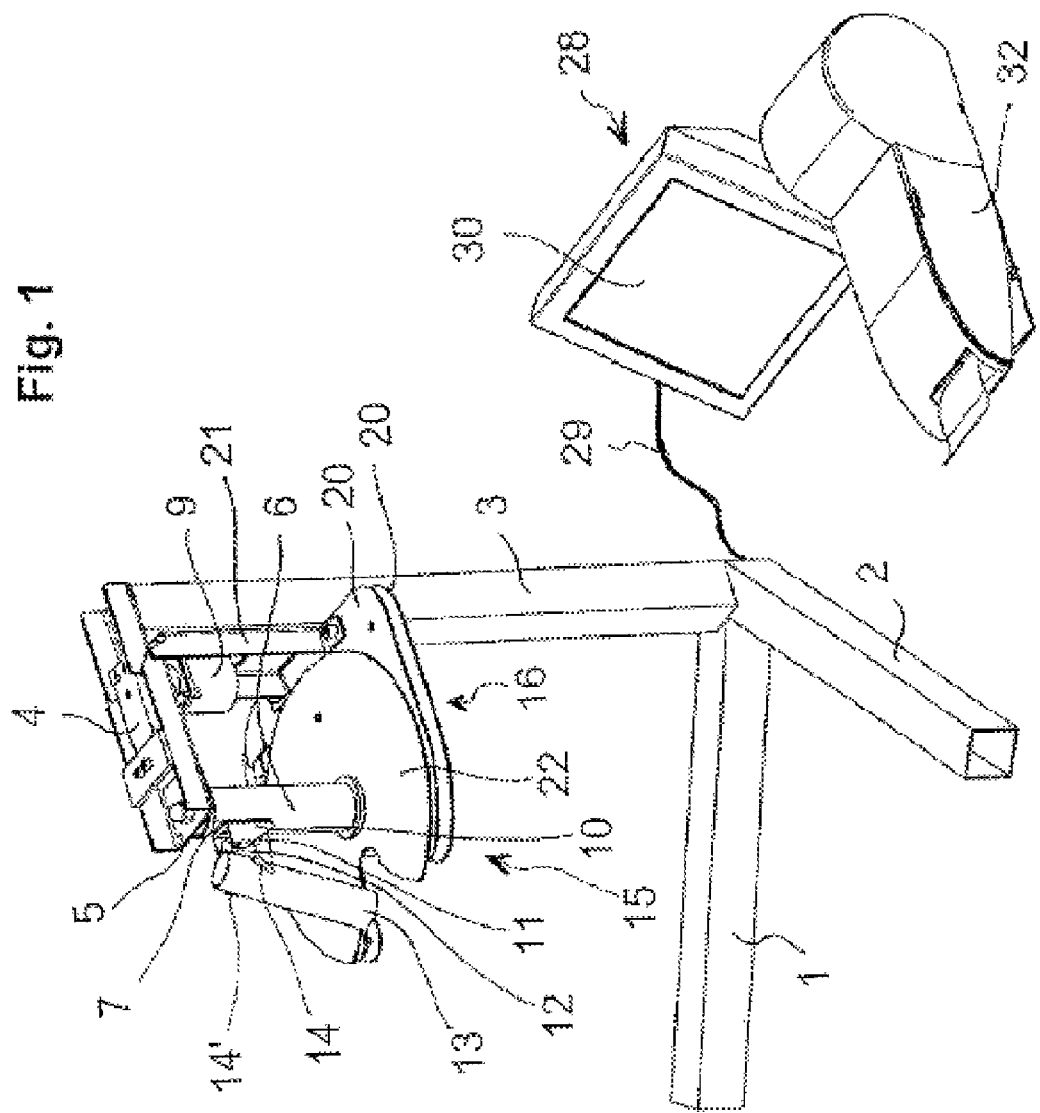

| | | |
|---|---|---|
| 2003/0120547 A1 | 6/2003 | Walter et al. |
| 2007/0080228 A1* | 4/2007 | Knowles et al. ......... 235/462.42 |
| 2010/0072279 A1* | 3/2010 | Spencer ........................ 235/454 |
| 2010/0092035 A1* | 4/2010 | Murdter ........................ 382/103 |

FOREIGN PATENT DOCUMENTS

| | | | |
|---|---|---|---|
| EP | 0314889 A2 | 5/1989 | |
| GB | 807665 A | 1/1959 | |
| JP | 63-238431 A * | 10/1988 | ................... 177/124 |

* cited by examiner

METHOD AND APPARATUS FOR WEIGHING A BAG WHEREIN THE BAG IS HELD OPEN BY A LOAD SUSPENSION PART SUCH THAT AN IMAGING BEAM DIRECTED AT THE GOODS IS UNOBSTRUCTED BY THE BAG WHILE IT IS BEING GRIPPED

The invention relates to a method for weighing of weighable goods placed in a bag having a filling opening, by means of scales having a load suspension part to receive the weight force acting on the weighable goods and its transfer to a load cell forming a weight value corresponding to the weight force.

With such known methods, the load suspension part of the scales serving to perform the method is coupled to a weighing plate. The weighable goods, after being placed in the bag by the consumer in self-service, are placed on this weighing plate. The weight force acting on the weighable goods is therefore transferred to the load suspension part supporting the weighing plate. Due to the transfer of the weight force loading the load suspension part onto the load cell which may take place in particular by means of a stepdown of force, the load cell forms the weight value corresponding to the weight force, which is printed out in the desired unit of measure, taking into account the specified calibration parameters. However, the weighing plate requires a relatively complex construction so that the weight value formed is independent of the position of the center of gravity of the weighable goods on the weighing plate within the scope of the required accuracy.

The object of the invention is to create a method of the type defined in the introduction and to create scales for performing the method which allow an improved performance of the weighing operation, in particular in self-service.

This object is achieved with regard to the method by the fact that the bag is suspended from the load suspension part by an area of the bag adjacent to the filling opening and the weight force is thereby transferred to the load suspension part.

With the inventive approach, the traditional weighing plate on which the weighable goods are placed is omitted. The horizontal dimensions of the load suspension part on which the bag is suspended, said part being at a right angle to the direction of the weight force, may be relatively small. Therefore, with all weighing operations, the position of the center of gravity of the weighable goods suspended from the load suspension part is always uniform within relatively narrow limits. Traditional bags, such as those used in self-service retail in particular, are at any rate provided with carrying straps that protrude in the area of their filling opening or perforations that form carrying straps, so they can easily be suspended from the load suspension part by means of these carrying straps without the need for additional special embodiments of the bag.

In an advantageous embodiment, it is also provided that the bag is detected, sealed and released again by a sealing device on an empty area of the bag situated between the area of the bag hanging from the load suspension part and an area of the bag containing the weighable goods. This may be automatically implemented in particular in such a way that the bag containing the weighable goods is sealed while it is suspended from the load suspension part and only when it is released by the sealing device after the sealing operation can it be picked up by the load suspension part. It is therefore impossible, after removal from the load suspension part, to add additional weighable goods to the bag. This prevents attempted fraud in self-service retail in a practical manner, in particular when a weight value is formed after sealing of the bag, as is provided in another expedient embodiment. This ensures that the price calculation, which can be made automatically in particular, can be based on the correct weight value, so it is impossible to add weighable goods not included in the weight value to the bag after the weighing operation in an attempt at deception.

The sealing is advantageously accomplished in such a way that the area of the bag inserted into the sealing device is constricted by it. In this way, the location of the bag which must be provided with the closure that cannot be opened again or at least not without any definitely discernible traces of manipulation is localized on the constriction of the bag which may contribute toward a saving of the effort for the closing measure.

An expedient procedure for forming the closure consists of welding the area of the bag introduced into the sealing device by means of the sealing device. This of course presupposes that the material of which the bag is made is suitable for welding. This prerequisite is usually met by traditional bags, such as those used in self-service retail. As an alternative, it is also possible for the area of the bag inserted into the sealing device to be banded or stapled by it. For example, an adhesive tape that has a sufficiently high adhesive power and cannot be released without tearing the bag would be a suitable banding material. Conventional staples may be considered for the stapling.

Furthermore, it is also provided within the scope of the invention that the bag suspended from the load suspension part is held open by the load suspension part and an imaging beam path from an image recording device is directed at the weighable goods placed in the bag without any interference with the beam path by the bag. In traditional optical detection of the weighable goods placed in a transparent bag on a weighing plate, the imaging beam path passes through the material of the bag. In this way, the bag often causes unwanted reflections, depending on its random arrangements of folds, thereby interfering with the optical detection of the weighable goods by the image recording device or even making it impossible. Due to the hanging arrangement of the bag on the load suspension part, the imaging beam path can be aimed directly at the weighable goods placed in the bag without the imaging bracket having to traverse the material of the bag in an unwanted manner or it detects parts of the bag. This yields an undisturbed image of the weighable goods that is faithful to the original.

This makes it possible very effectively to implement the essentially known measure, whereby the weighable goods placed in the bag are automatically identified by means of image recognition software on the basis of the image generated by the image recording device. The automatic identification of the weighable goods by the image recognition software permits automatic access to a price per unit of weight assigned to the respective weighable goods, from which the final price of the weighable goods can be determined automatically using the weight value thus formed.

In this context in particular, it is also expedient that a label containing the weight value thereby formed is printed out. In addition to the weight value, the price per unit of weight, the final price and other information pertaining to the weighing and/or selling process can also be printed out on this label. Furthermore, it is expediently provided that the label is automatically brought to the bag. This not only increases operating convenience for the user but also precludes the wrong label being attached in attempted fraud. As an alternative, the weight value and optionally additional information may also be printed on the bag. This may be performed by means of a suitable ink jet printer, for example.

In addition, it is possible to provide for the label to be printed in response to the sealing of the bag. This is especially expedient when the sealing device does not operate automatically but instead the user must pass the bag manually through the sealing device. The fact that the label is made available only in response to sealing contributes toward security against fraud in that it proves that the user has sealed the bag properly.

Furthermore, to prevent the possibility of fraud, it may be expedient for a weight value to be formed after sealing the bag. As an alternative, it is also possible for the sealing device to be operated in response to an external command, which is entered by the user on a keypad on the scales, for example. With the first possibility, this weight value may be used as the basis for the price calculation in a manner that secures against fraud because it reflects the weight of the closed bag, the contents of which can no longer be altered. With the second possibility, operation of the sealing device cannot be accessed by the user after the weight value has been formed, so that this weight value is also suitable for the price calculation.

With regard to the device, the inventive object is achieved by scales having a load suspension part to receive the weight force acting on weighable goods placed in a bag having a filling opening and transferred to a load cell which forms a weight value corresponding to the weight force, these weighing scales being characterized according to the invention by the fact that the load suspension part has a device by means of which the bag can be suspended from the load suspension part by an area of the bag adjacent to the filling opening and the weight force can thereby be transferred to the load suspension part via the bag.

Using these scales, the method defined in Patent claim 1 can be executed. These scales are expediently designed so that the device has at least one part protruding across the direction of weight force for engagement in a receiving opening formed in the area of the bag adjacent to the filling opening. This receiving opening of the bag can be formed, for example, by a grip opening of a carrying strap formed in the area of the bag adjacent to the filling opening or the grip opening of a carrying strap attached to the bag in this area is formed. With regard to the usual paired arrangement of these grip openings, it then proves expedient that two of the protruding parts are provided on opposite locations on the load suspension part across the direction of the weight force. In this case the bag with its two grip openings hangs on the two protruding parts.

Following another basic idea of the invention, a sealing device is also provided, sealing the bag in an empty area of the bag situated between the area of the bag suspended from the load suspension part and the area of the bag containing the weighable goods. With scales designed in this way, the method according to Patent claims 2 through 8 can be implemented.

An expedient embodiment in this regard consists of the fact that the sealing device has a guide slot extending between an open inlet end and an open outlet end in this direction of the weight force beneath the load suspension part, the empty area of the bag suspended from the load suspension part being insertable into this guide slot from the inlet end and passable to the outlet end by a relative movement between the load suspension part and the guide slot, and a closing device engaging in the guide slot is situated in front of the outlet end, by means of which the empty area of the bag which is passed by it can be provided with a closure means. In this embodiment, the user, in particular the self-service consumer, will hang the bag on the load suspension part, so that the empty area of the bag hanging down from the load suspension part reaches the inlet end of the guide slot. Meanwhile, the scales continuously indicate the weight value corresponding to the weighable goods suspended from the scales and display this value for the user on a visual display assigned to it. If this weight value does not meet the user's wishes, he can remove the bag from the load suspension part and repeat his filling with the weighable goods by altering it to conform to his wishes by removal or addition and then repeat the operation. Next the user prompts the relative movement between the load suspension part and the guide slot. In this way, the bag with its area entering into the guide slot is moved along the guide slot in the direction of the closing device and in this passage is sealed with the closure means. Next the bag, suspended from the load suspension part, goes to the outlet end of the guide slot, where it can be removed by the user and disconnected from the load suspension part.

A drive device driving the relative movement between the load suspension part and the guide slot is preferably provided. In addition, the embodiment may be such that the load suspension part can be moved along a path of movement following the guide slot by the driving device and thereby produces the relative movement between the load suspension part and the guide slot by means of which the empty area of the bag suspended from the load suspension part can be guided from the inlet end of the guide slot to its outlet end. In this case, the user can start the drive device and thus the traversing movement of the load suspension part by a corresponding input on an operating field of the scales, e.g., on a touch screen. This startup prevents the user from accessing the bag further. Furthermore, the input that triggers the start may serve to notify the scales that the weight value formed as of the starting point in time represents the final weight value to be used as the basis for the price calculation. Alternatively, it is also possible not to form the weight value only after sealing the bag.

The embodiment explained above, in which the relative movement is induced by the drive of the load suspension part along the path of movement following the guide slot, is kinematically reversible. This results in another variant in which the load suspension part remains stationary with respect to the basic frame of the scales, whereas the guide slot is induced to a corresponding movement, by means of which the empty area of the bag suspended from the load suspension part can be moved along a path of movement that follows the guide slot from its inlet end to its outlet end.

It is expediently provided that the guide slot tapers from its inlet end to its outlet end and the closing device is arranged in the tapered area. In this way, the constriction of the bag indicated in claim 3 can be accomplished during its movement through the guide slot to the closing device.

In a further improved embodiment, the sealing device has a guide element provided with two fork-like opposing guide arms, said guide arms being movable from a receiving position situated outside of the guide slot, where the empty area of the bag suspended from the load suspension part is insertable from its free end between the guide arms to the inlet end of the guide slot, with guide arms extending across the former along a path of movement following the guide slot to its outlet end up to a removal position situated outside of the guide slot. In this embodiment, the bag is reliably guided between the fork-like opposing guide arms during its movement along the guide slot. At the same time, the dimension of the bag between the guide arms, as seen in the longitudinal direction of the guide slot, is limited and is therefore contracted in this longitudinal direction. The latter is advantageous for the effect of the closing device and can be further increased in another expedient embodiment by bringing the guide arms into proximity to one another during their movement from the inlet end to the outlet end of the guide slot.

Additional expedient embodiments of the sealing device are defined in the dependent claims 25 to 36.

All the embodiments may be designed in such a way that the load suspension part is supported on a movable parallelogram leg of a parallelogram guide mounted on a base frame of the scales with one stationary parallelogram leg opposite the former or supported on the free end of a bending bar. In the former case, the movable parallelogram leg of the parallelogram guide is loaded by the weight force exerted by the weighable goods. In a known manner, either the movable parallelogram leg may be connected to an electromagnetic force component device or the elastic parallelogram guide arms which connect the movable and the stationary parallelogram legs to one another may be provided with wire strain gauges, as is the case with bending bars. In the one case, the electromagnetic force compensation device supplies an electric signal corresponding to the weight force in a known manner. In the other case, this electric signal is supplied by the wire strain gauges connected to a measurement bridge.

According to another important aspect of the invention, an image recording device is provided, having an unobstructed imaging beam path directed at the weighable goods placed in the bag, said beam path being unobstructed by the bag due to its spatial arrangement relative to the filling opening of the bag suspended from the load suspension part, with the filling opening held open by the load suspension part. The method defined in Patent claim 9 can be implemented through this design of the scales.

It is then expedient to provide an image recognition device, which automatically identifies the weighable goods placed in the bag on the basis of the image created by the image recording device. This makes it possible to implement the method defined in Patent claim 10.

It is expedient that to arrange the image recording lens of the image recording device on the load suspension part. This embodiment is further improved by the fact that the load suspension part has a hollow area in which the image recording lens is situated and which protrudes through the filling opening into the bag hanging from the load suspension part with an opening that serves to allow the passage of the imaging beam path. In this case, the bag is held in a spread-open position by the area of the load suspension part having the image recording lens and the unhindered path of the imaging bracket, i.e., a free line of sight of the image recording device to the weighable goods placed in the bag is reliably ensured.

Within the scope of the present invention, an illumination device directed at the weighable goods placed in the bag hanging from the load suspension part is also provided. Due to this illumination device, the weighable goods are optimally illuminated regardless of the prevailing ambient light conditions for operation of the image recording device. This illumination device need only be activated during the recording operation of the image recording device. This activation operation can easily be controlled automatically. This illumination device may be set up in the vicinity of the image recording lens in such a way that it emits its illumination brackets in the direction of the optical axis of the imaging beam path. For example, it may be accommodated jointly with the image recording lens in the hollow area of the load suspension part.

Figure 2:
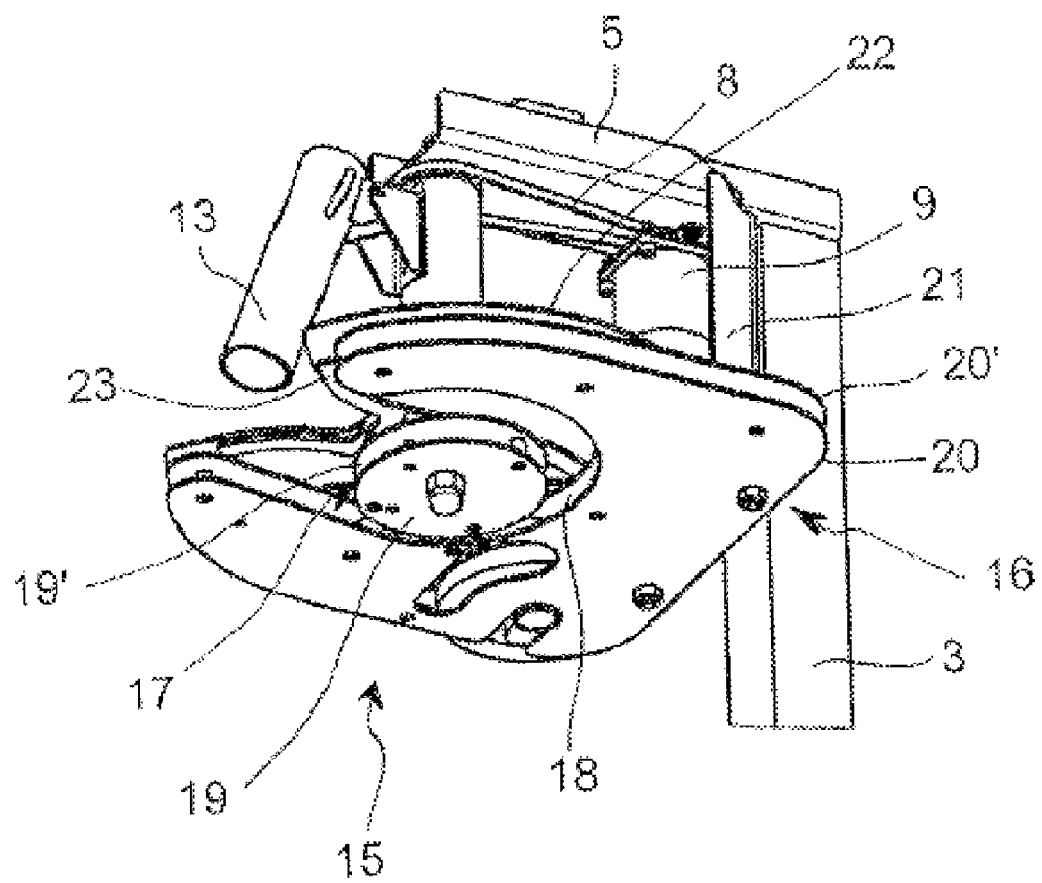
Figure 9:
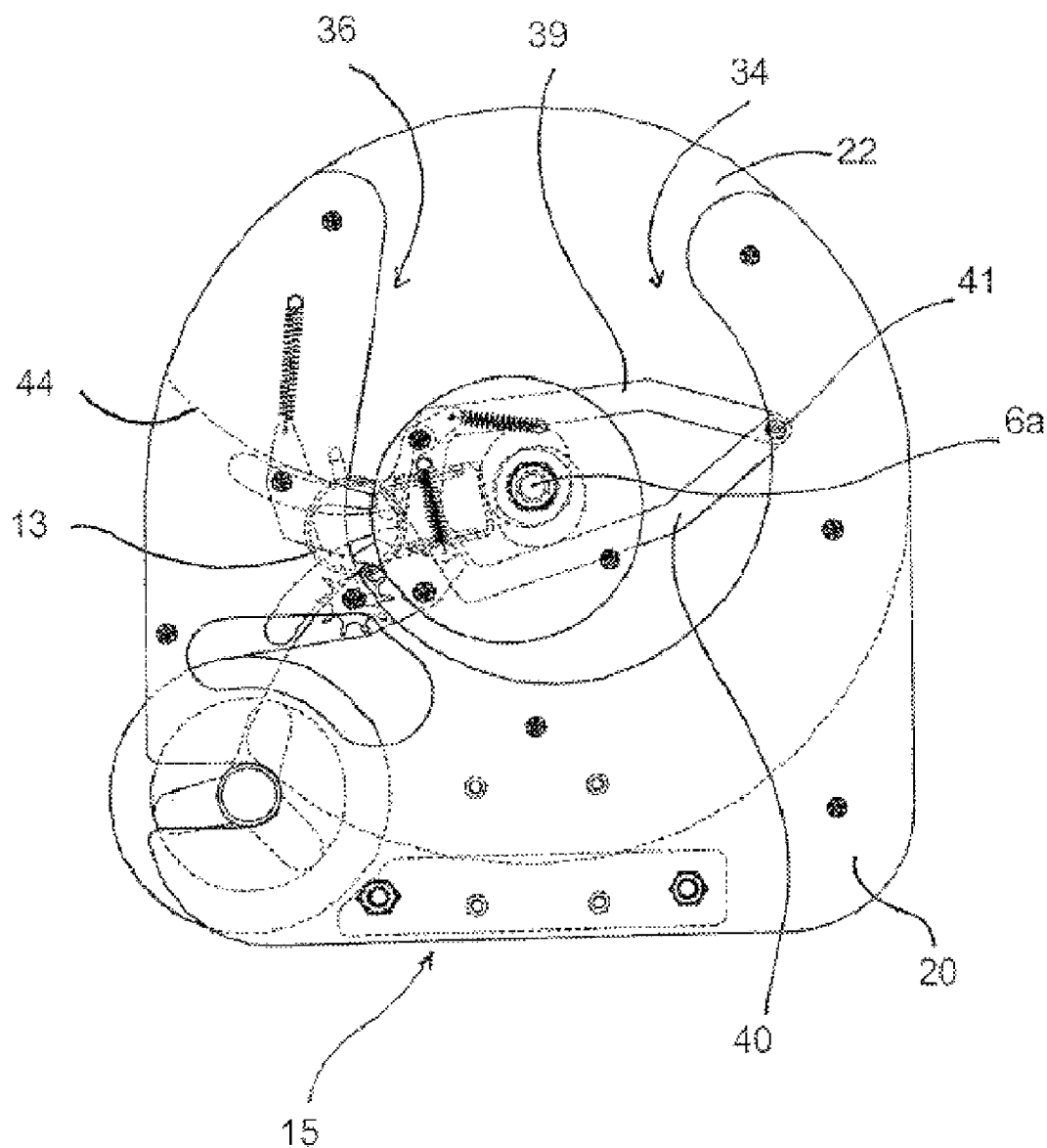
Figure 10:
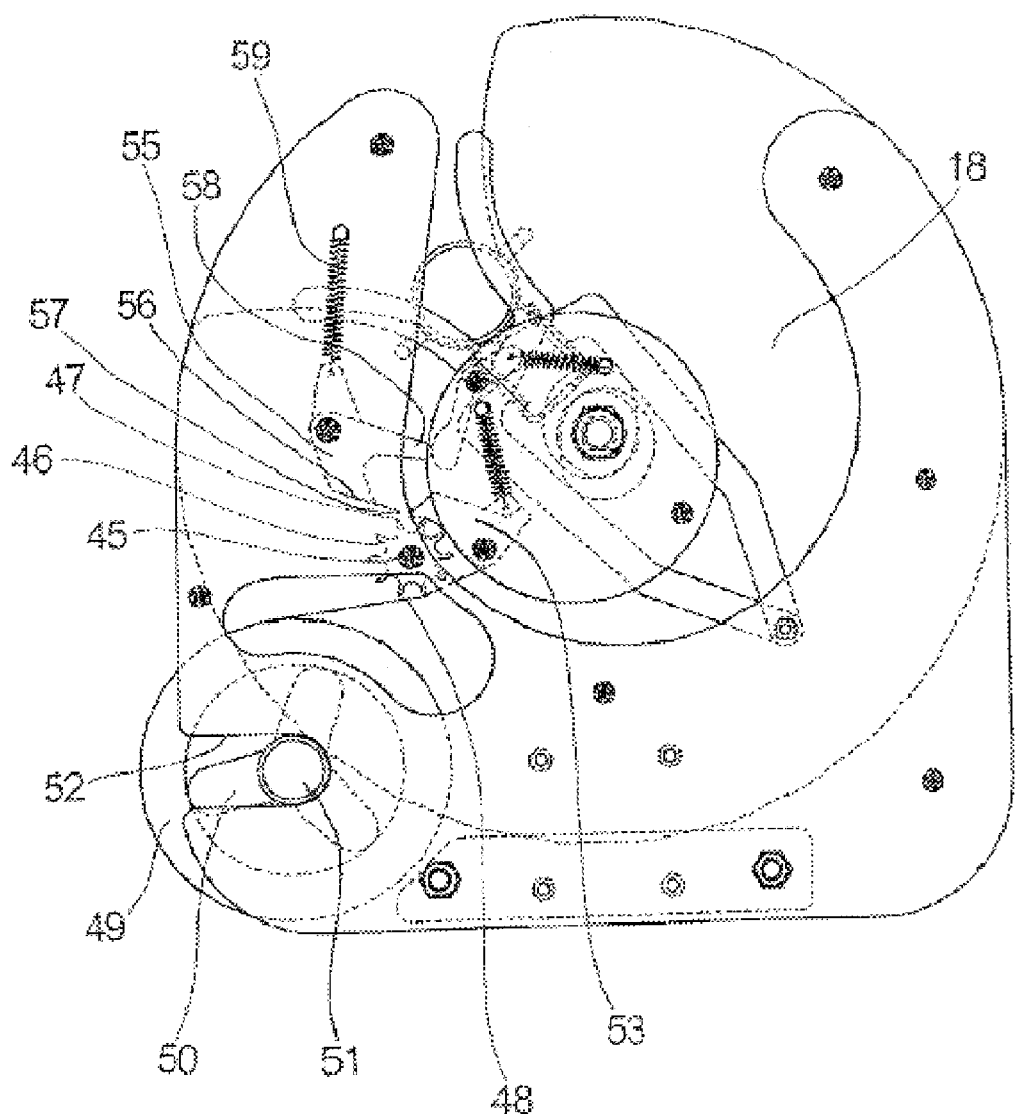
Figure 11:
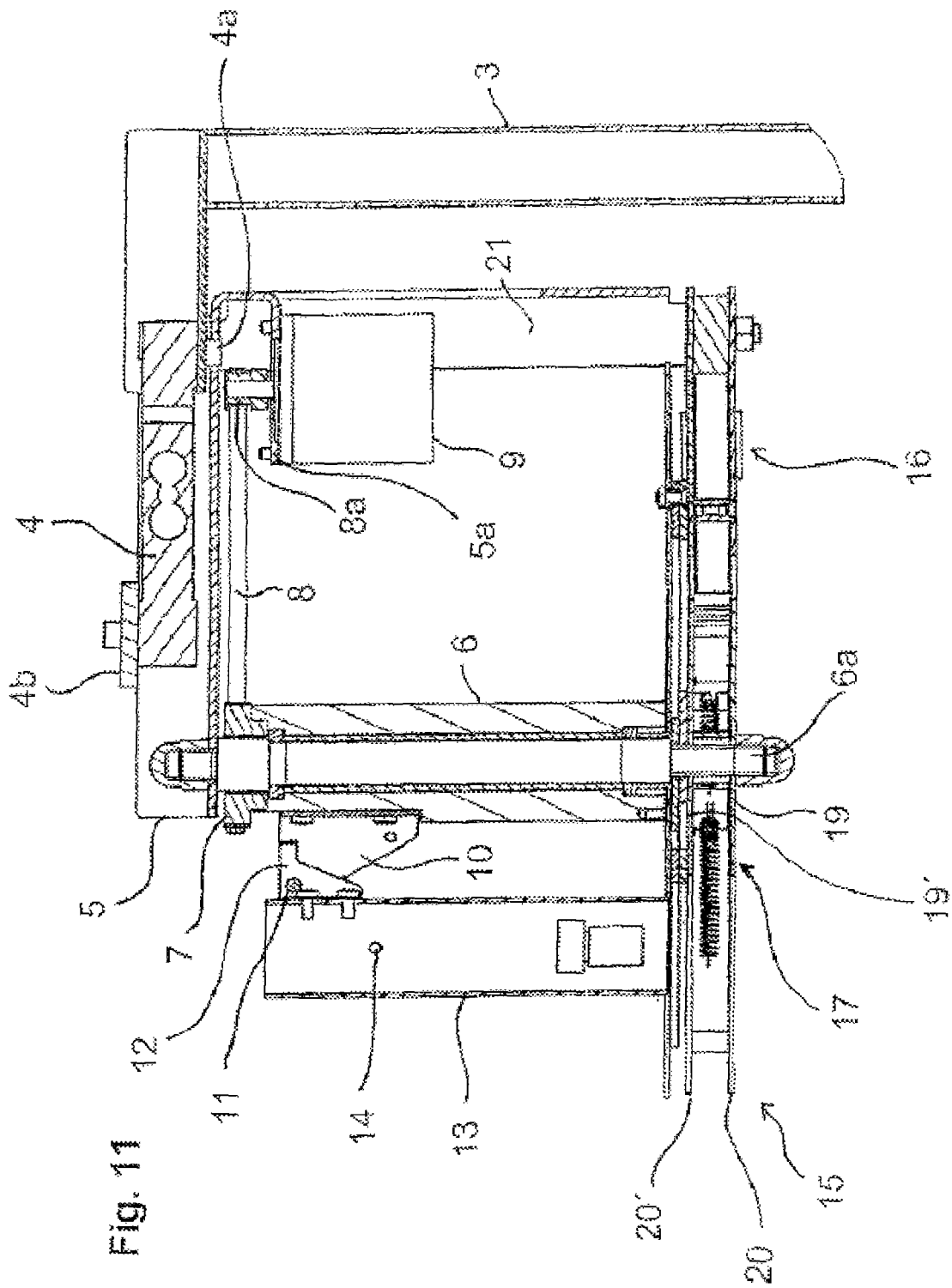
Figure 12:
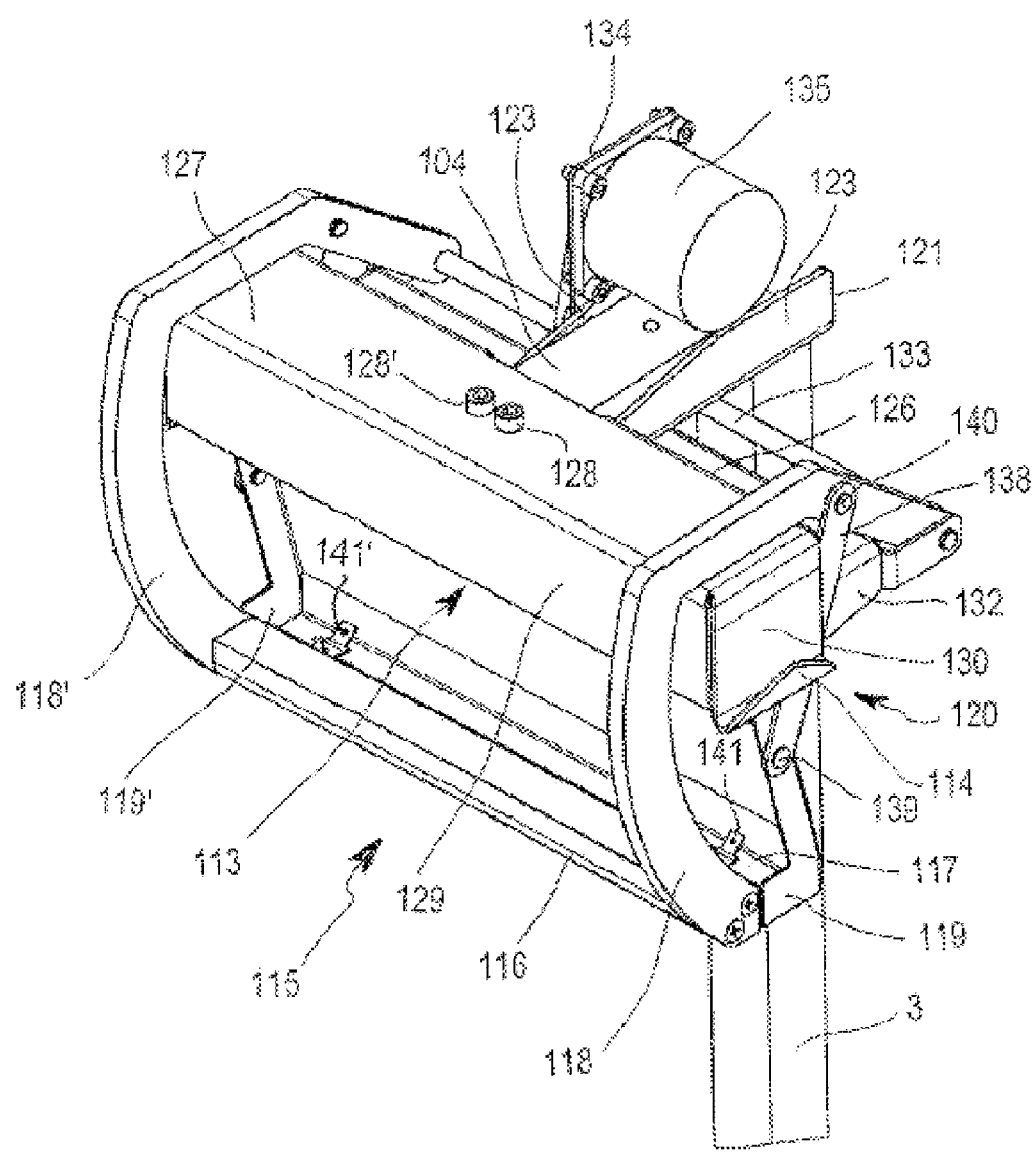
Figure 13:
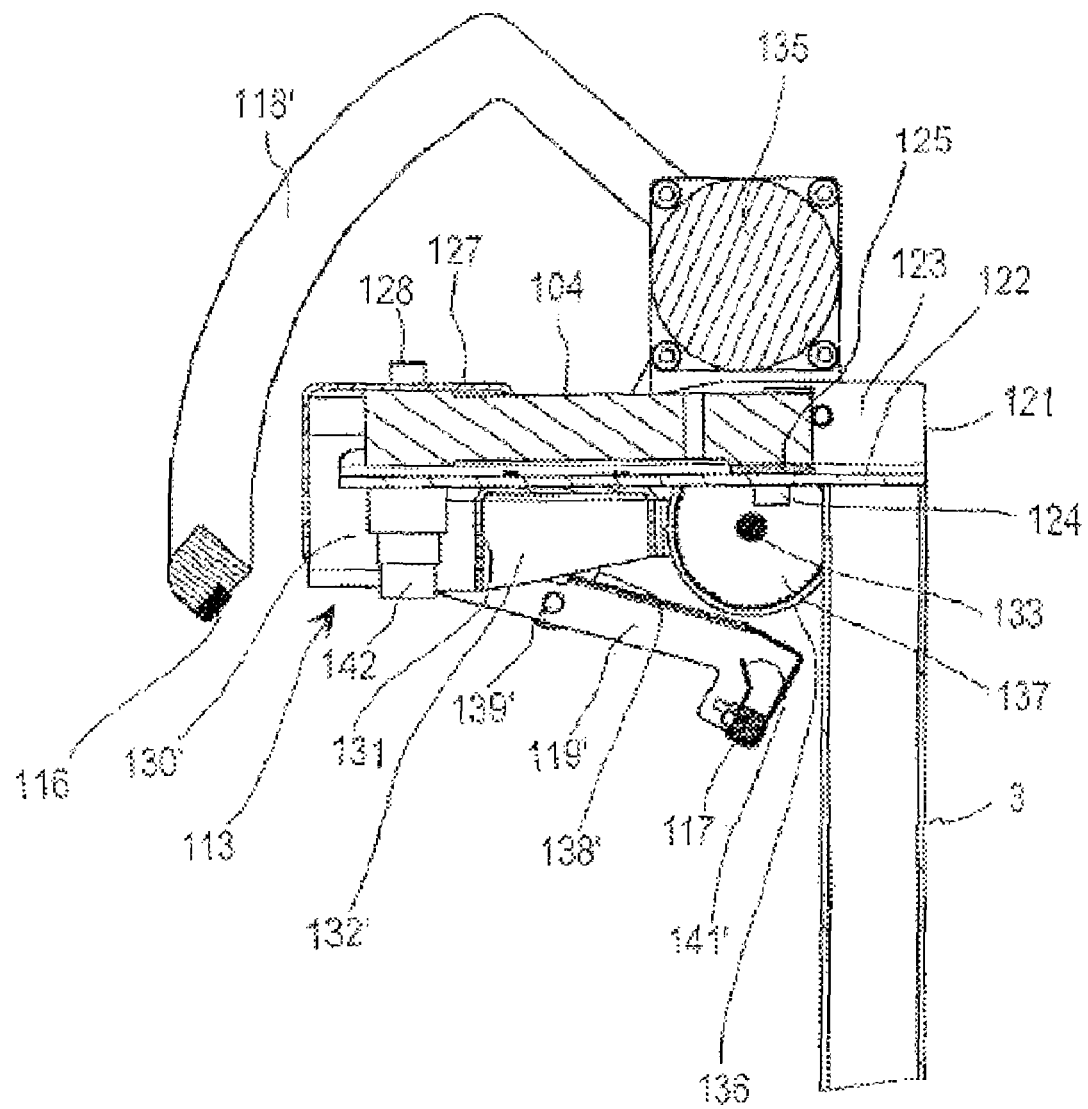
Figure 14:
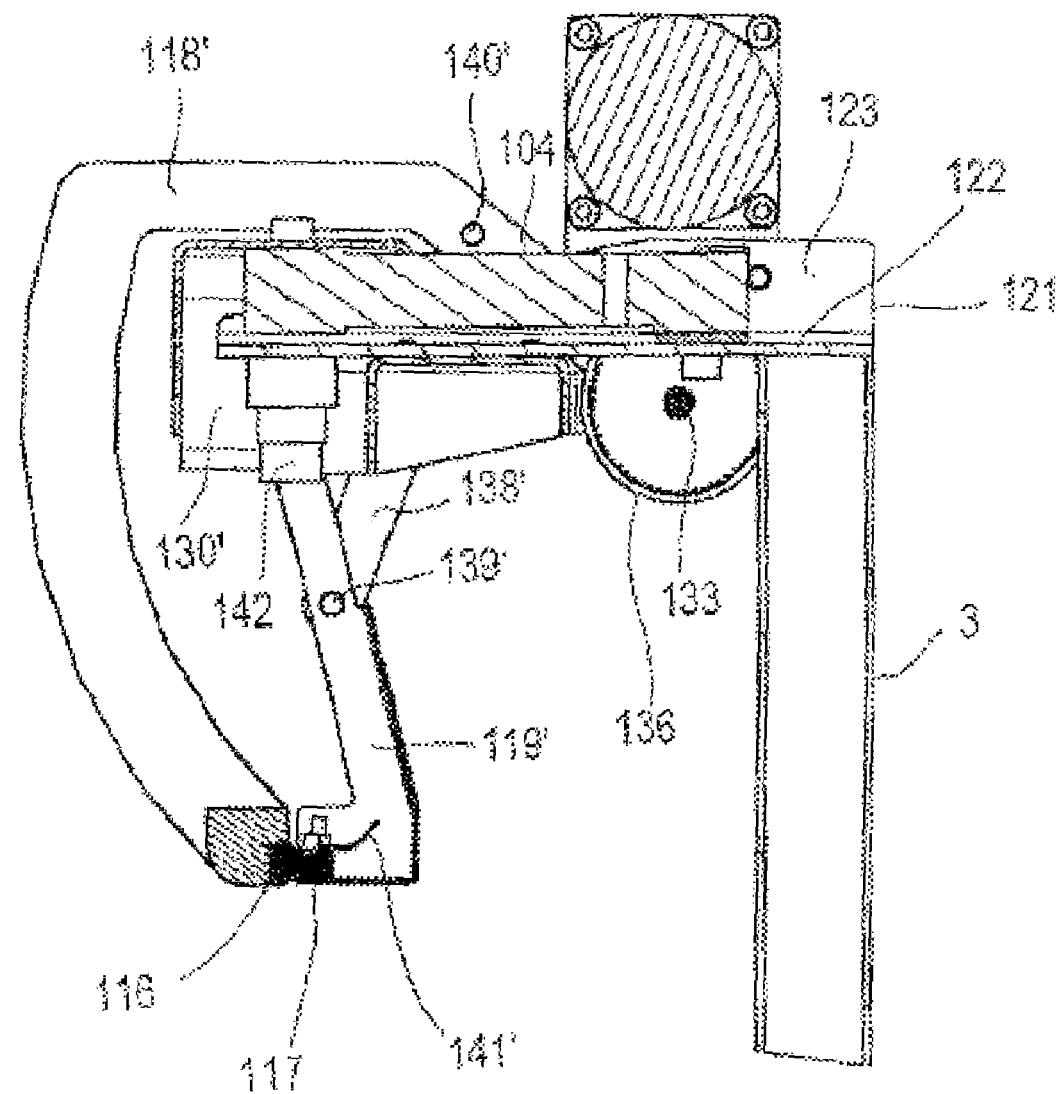

In the following description, the invention is explained as an example with reference to the drawings, in which FIG. 1 shows a perspective overall view of a first embodiment of scales provided with a sealing device, FIG. 2 shows an upper area of the scales shown in FIG. 1 having the sealing device, shown here in a perspective from underneath, FIGS. 3 to 6 show a series of operating states through which the scales pass in succession, FIGS. 7 to 10 show lower views of the sealing device in a series of successive operating states, and FIG. 11 shows a vertical section through the area shown in FIG. 2, FIG. 12 shows a perspective view of an upper area of a second embodiment in which the sealing device is formed by a welding device, FIGS. 13 and 14 show partial sectional side views of the embodiment of FIG. 12, with the welding device in its open position and in its welding position, respectively.

According to FIG. 1, the embodiment of the scales illustrated in FIGS. 1 through 11 has a supporting frame in which two legs 1, 2 arranged in a V shape serve to support the scales on a horizontal plane and are rigidly connected to a vertical pillar 3 at the apex of the V shape. At the end of the pillar 3 opposite the apex of the V shape, there is an area of a load cell 4 that is fixedly mounted on the frame and is secured by means of a screw bolt 4a (FIG. 11). On the load application area of the load cell 4 opposite the area rigidly mounted on the frame, a horizontally protruding section 5 of a supporting profile having a U-shaped cross section is fixedly secured by means of a clamping plate 4b.

A tubular body 6, which is clearly discernible in FIGS. 1 and 11 in particular, its central longitudinal axis being aligned vertically, is rotatably mounted on a vertical bearing axle 6a (FIG. 7), which is secured at its upper end on the free end area of the section 5 of the supporting profile facing away from the vertical pillar 3. A drive belt 8 (FIG. 2) runs to a drive pulley 8a via a pulley 7 which is rotationally fixed on the tubular body 6 and is arranged on the upper end thereof, said pulley sitting on a drive shaft of an electric motor 9 mounted on a flange section 5a of the section 5 of the supporting profile facing the vertical pillar 3. The tubular body 6 can be driven to rotate about its central longitudinal axis by means of this drive chain.

On the outer lateral surface of the tubular body 6, a U-shaped holding clamp 10 is secured with its U leg in the upper area of this body, the two ends of a horizontal pivot axis 11 being supported in its U legs. The two U legs of a holding clamp 12 complementary to the holding clamp 10 are pivotably mounted on the horizontal pivot axis 11, the upper end area of a tubular load suspension part 13 being attached to its U-shaped web. The load suspension part 13 has two parts 14, 14' that extend across its longitudinal axis, arising from two diametrically opposed locations on the upper area of its outer lateral surface and curved upward and away.

In the area of the lower end of the tubular body 6, there is a sealing device 15, which is shown in a perspective view in FIGS. 1 and 2 and in a vertical sectional view in FIG. 11. This sealing device has a stationary base body in which a guide slot 18 is bordered between an outer partial body 16 and an inner partial body 17 arranged in a recess in the outer partial body 16. The inner partial body 17 has two disk-shaped plates 19, 19' arranged at a mutual vertical distance, each extending at a right angle to the vertical bearing axle 6a of the tubular body 6 and being secured at the lower end of this stationary bearing axle 6a at a radial distance from its center.

The outer partial body 16 has outer plates 20, 20' which are each horizontally aligned with the disk-shaped plates 19, 19' and are connected to one another vertically at the distance of the two disk-shaped plates 19, 19', extending with an edge area up to a fastening section 21 of the supporting profile that is parallel to and at a distance from the vertical pillar 3 and are secured thereto. The fastening section 21 of the supporting profile is designed in one piece with this section 5 and, like the latter, has a U-shaped cross section. FIG. 11 shows that the supporting profile is attached only by means of the clamping plate 4b to the load application area of the load cell 4. In the area of the screw bolt 4a, the section 5 has a recess through which the screw bolt 4a passes with a generous clearance, so that there is no connection there to the load cell 4.

A guide disk 22 is attached at the lower end of the tubular body 6 that is rotatably mounted on the vertical bearing axle 6a, said lower end being situated at an axial distance above the inner partial body 17 and extending radially above the outer partial body 16 of the inner partial body 17. A guide element 23 is arranged on this guide disk 22, its design and functioning being explained in greater detail below with reference to FIGS. 7 through 10.

Figure 3:
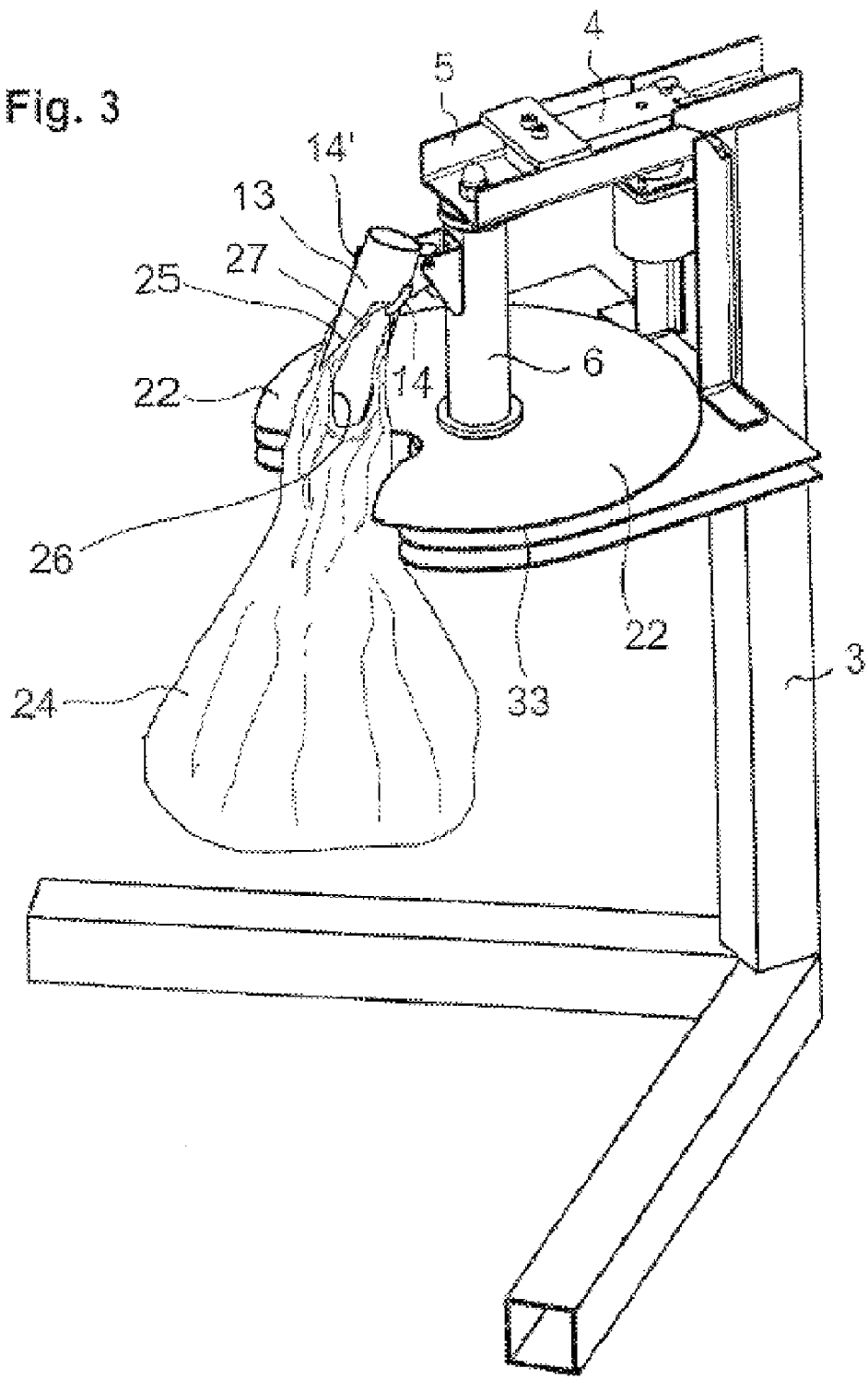

The weighable goods to be weighed with these scales are placed in a bag 24, which is then suspended according to FIG. 3 with its area adjacent to its filling opening 25 on the load suspension part 13. To do so, in the exemplary embodiment shown here, the bag has two receiving openings 26, which are brought to engagement with the protruding parts 14, 14' and otherwise serve as grip openings that limit the supporting strap 27 in conveyance of the bag 24. In this suspension operation, first the load suspension part 13 is stretched by spring force into the pivoted position with respect to the vertical direction, as illustrated in FIG. 3, thereby facilitating the handling in suspension of the bag. The guide disk 22 then assumes a rotational position (to be explained in greater detail with reference to FIGS. 7 to 10), in which the bag with the empty area extending between the area of the bag hanging from the load suspension part 13 and the lower area of the bag containing the weighable goods then enters the sealing device 15.

Figure 4:
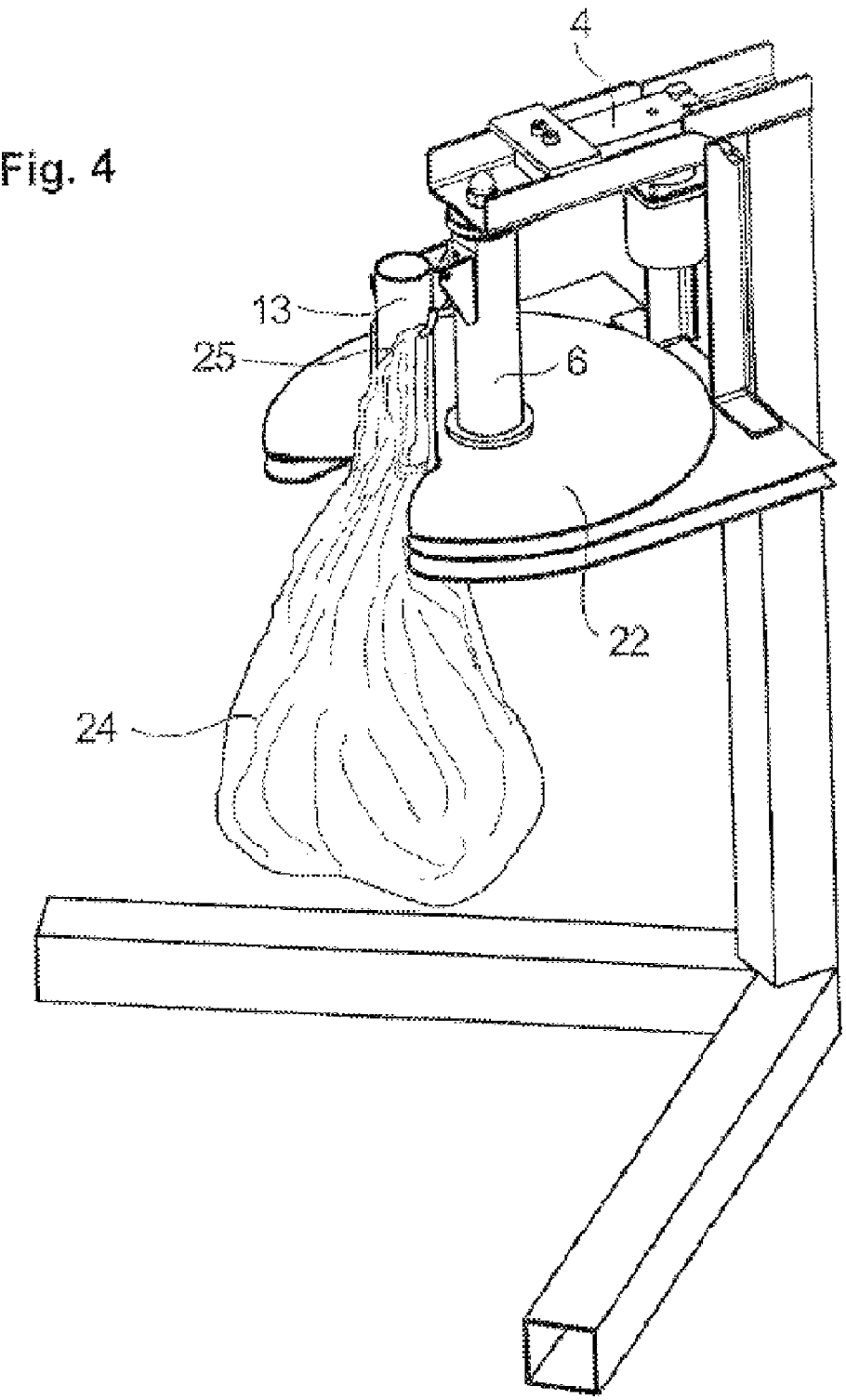

Due to the suspension of the bag 24, the load suspension part 13 is loaded with the weight force acting on the weighable goods to be added and is aligned along its vertical direction according to the diagram in FIG. 4. The load suspension part 13 conveys the weight force over the tubular body 6 and the supporting profile 5 to the load cell 4, which supplies a corresponding weight value or a raw signal suitable for forming this weight value. The weight value, i.e., the raw signal, is output to a control and analyzing unit 28, which is connected by a line 29 to the components of the scales situated on the vertical pillar 3. The control and analyzing unit 28 is provided with a visual display unit 30, which displays the weight value of the weighable goods suspended from the load suspension part 13 and the weighable goods recognized by the image recognition software. It should be pointed out that the bag 24 is usually very light, so its contribution to the weight value is negligible. Otherwise, a non-negligible weight of the bag 24 could be taken into account by previous taring or by using a predefined fixed tare value.

Figure 5:
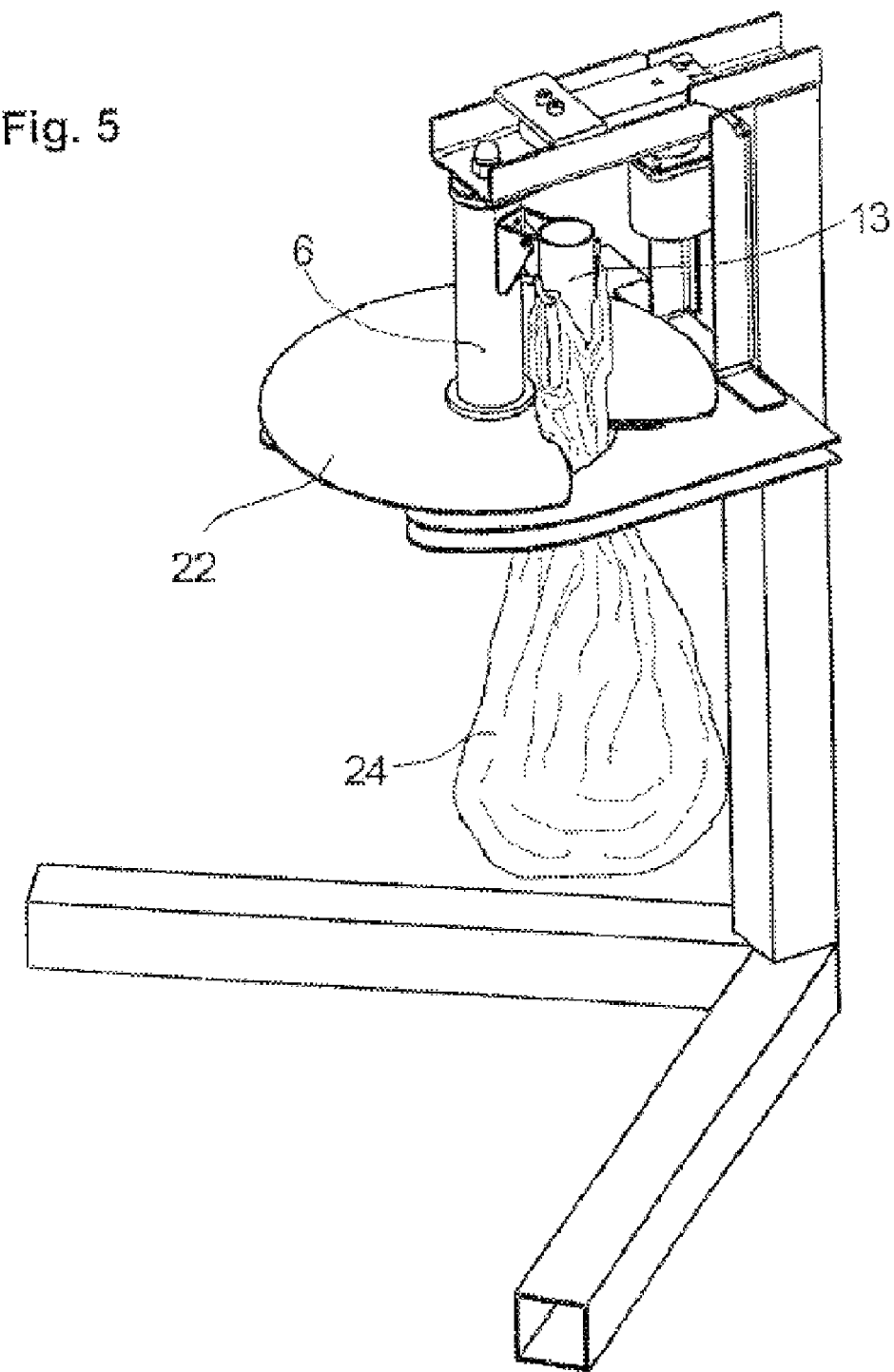
Figure 6:
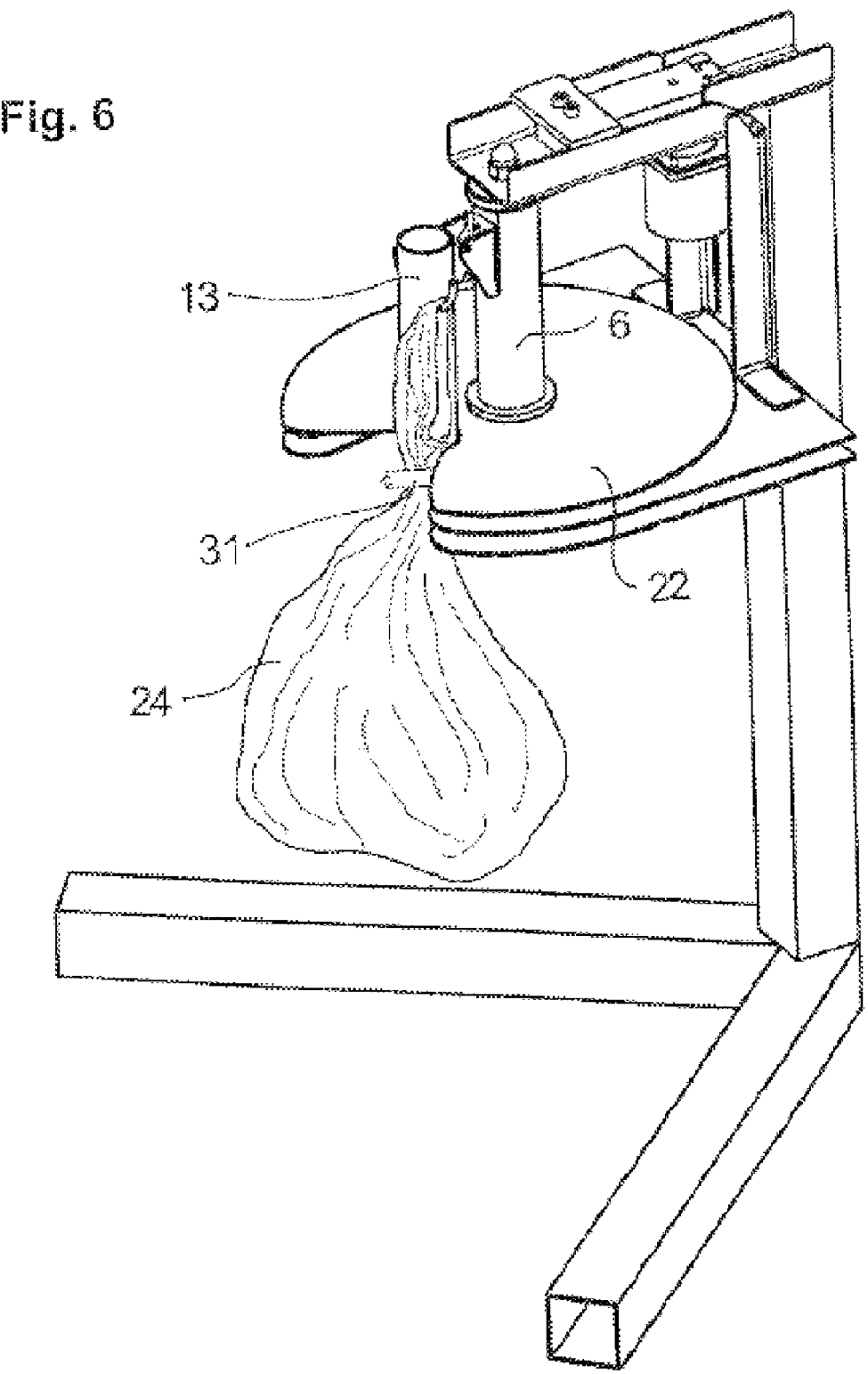

If the weight value displayed on the visual display unit 30 does not meet the expectations of the user of the scales, e.g., a self-service consumer, the user can remove the bag 24 and adjust the filling weight by removing some weighable goods or adding extra weighable goods in accordance with his wishes. As soon as the desired weight value is displayed, optionally after adjustments, the user triggers the sealing device by operating a corresponding operating element on the control and analyzing unit. In the exemplary embodiment shown here, the visual display unit 30 is designed as a touch screen on which the respective operating element is displayed. In this way, the electric motor 9 is started, and the tubular body 6 together with the load suspension part 13, which is connected to it in an articulated joint, and the guide disk 22 attached to the tubular body 6 are rotated by 360°. FIG. 5 shows the rotational position, which is offset by approximately 90° with respect to the starting position in FIG. 4. In FIG. 6, the arrangement has reached its starting position after a full 360° rotation. FIG. 6 also shows that after this full passage through the sealing device 15, the bag 24 has been sealed with a section 31 of adhesive strip in a manner to be described in greater detail below with reference to FIGS. 7 to 10.

The control and analyzing unit 28 is equipped with a calculator unit, by means of which the purchase price of the weighable goods is calculated based on the weight value determined by the scales and a predefined price per unit of weight.

The price per unit of weight is available to the scales from a memory for each type of item in an assortment of items. For access to the price per unit of weight pertaining to the weighable goods to be weighed at that moment, it is therefore necessary to identify the weighable goods with regard to its belonging to a certain type of goods. This may be accomplished, for example, by the user touching a field assigned to that type of goods, e.g., by a corresponding illustration or name, e.g., on the touch screen 30. This is provided especially commonly for the sale of fruits and/or vegetables.

Instead of this identification of the weighable goods requiring user intervention, an automatic identification is provided in the exemplary embodiment illustrated here. To do so, an image recording device (not shown) is arranged inside the tubular load suspension part 13, such that the optical axis of its image recording lens (also not shown) runs parallel to the central longitudinal axis of the tubular load suspension part 13. In this way, the imaging beam path is aimed through the filling opening 25 of the bag 24, which is kept open by the load suspension part 13, directly at the weighable goods placed in the bag without obstruction of the view of the image recording lens by the bag. In addition, an illumination device (not shown) which is aimed at the weighable goods situated in the bag 24 is arranged in the tubular load suspension part 13. For example, this illumination device may be a suitable arrangement of light-emitting diodes. The image of the weighable goods created by the image recording device is automatically identified by suitable image recognition software in an image recognition device. On the basis of this automatic identification, the control and analyzing unit 28 then calculates the selling price of the weighable goods without any manipulation on the part of the user.

A label printer 32, which is diagramed schematically in FIG. 1, is connected to the control and analyzing unit 28. It prints a self-stick label with information of interest for the sale of the weighable goods, in particular the selling price, the weight and the price per unit of weight. In the embodiment illustrated here, this self-stick label is taken from the printer 32 by the user and attached adhesively to the bag 24. As an alternative, a device (not shown) with which the label is automatically attached to the bag 24 without any manipulation by the user may also be provided. In this case, the printing operation may also be performed directly on the bag, which may be done by a suitable ink jet printer, for example.

As already explained above, details of the sealing device 15 are apparent from FIGS. 7 to 10, which show views of various rotational positions of the bottom side of the sealing device 15. For the sake of clarity, the bag hanging from the protruding parts 14, 14' of the load suspension part 13 has not been included in the drawing for the sake of simplicity.[1]

---
[1] TN: Not exactly redundant but too similar for such a short sentence: "der Deutlichkeit halber" ("for the sake of clarity") and "der besseren Übersichtlichkeit halber" (done as "for the sake of simplicity" here—could also be translated "for the sake of better clarity").

FIGS. 7 to 10 each show the lower disk-shaped plate 19 of the inner partial body 17, the lower outer plate 20 of the outer partial body 16 and the guide slot 18 which is bordered between the two partial bodies. The guide slot creates a view of the guide disk 22, which is concealed in the lower half of FIGS. 7 to 10 by the outer plate 20 of the outer partial body 16, which is why the outer circumferential edge 33 of the guide disk 22 is illustrated with a dotted line there.

FIGS. 7 to 10 illustrate how the load suspension part 13, indicated on the tubular body 6, executes a circular path of movement centered about the central axis 6a of the vertical bearing axle, following the rotation of the tubular body 6, the plane of the path of movement running above the guide slot 18 with respect to the vertical direction of the weight force. As can be seen from the path of movement from the starting position illustrated in FIG. 7 into the movement phase illustrated in FIG. 8, this path of movement begins at an open inlet end 34 of the guide slot 18, passes in the remaining course of movement, as illustrated in FIG. 9, through a closing device 35, then leaves the guide slot 18, as illustrated in FIG. 10, passing by an open outlet end 36 and then returning back to the starting position illustrated in FIG. 7. In adaptation to this circular movement path, the edge 37 of the outer plates 20, 20' forming the outer partial body 16, said edge limiting the guide slot 18 toward the outside and being designed in a curve such that the guide slot 18 which is limited on the inside by the circular edge 38 of the disk-shaped plates 19, 19' of the inner partial body.

In addition, the guide element 23 arranged on the guide disk 22 in FIGS. 7 to 10 can also be seen. It is has two guide arms 39, 40, which are opposite one another like a fork with respect to the direction of the weight force and are beneath the load suspension part 13, so that the empty area of the bag hanging from the load suspension part 13 comes to lie between them. The guide arms 39, 40 are connected at their ends opposite the fork-like opposing areas in an articulated joint at a common fulcrum 41 on the guide disk 22. The control cam of a cam disk 42, 43, which is in a rotationally fixed connection to the vertical bearing axle, acts on each of the two guide arms 39, 40 in a central area situated between the fulcrum 41 and the fork-like opposing areas, such that the fork-like opposing areas of the guide arms 39, 40 approach one another during their movement along the circular path of movement of the load suspension part 13, moving from the inlet end 34 to the outlet end 36 of the guide slot 18, as shown clearly in FIGS. 7 through 10. The guide arms 39, 40 are held in contact with their control cams by springs (not shown).

Figure 7:
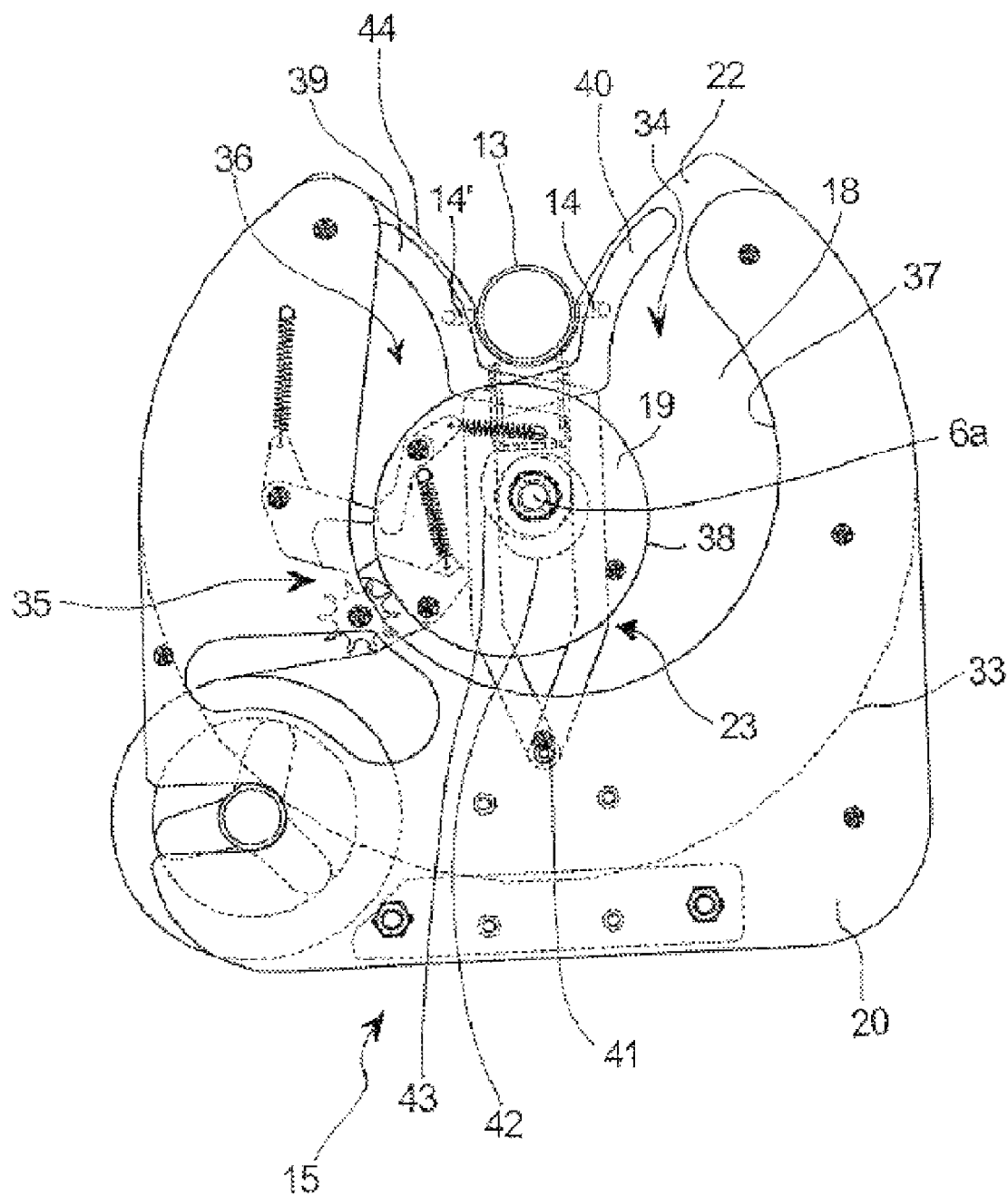
Figure 8:
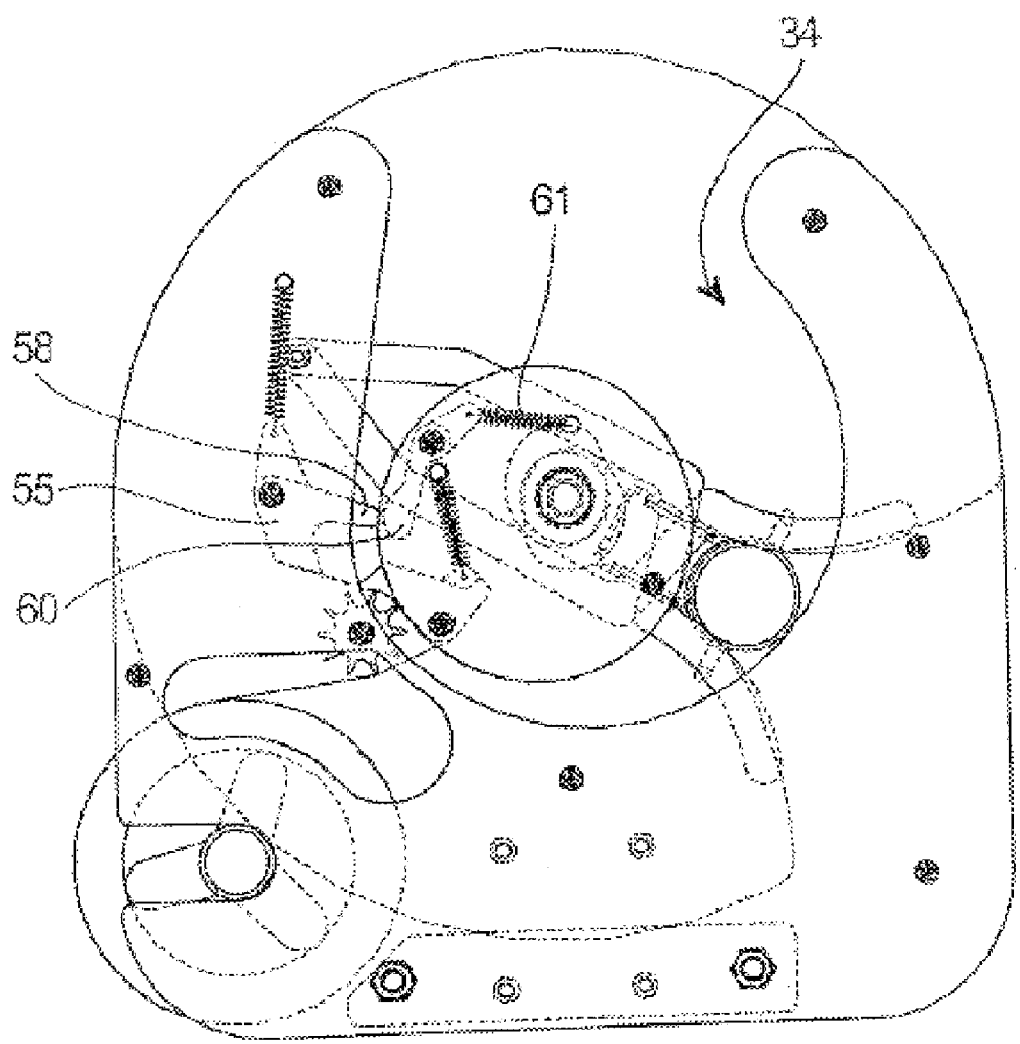

Due to this arrangement, the empty area of the bag 24 reaches the receiving station illustrated in FIG. 7, where the fork-like opposing areas of the guide arms 39, 40 are between the inlet end 34 and the outlet end 36 of the guide slot and assume their greatest mutual open position between the two guide arms 39, 40. To this end, the guide disk 22 arranged above the guide arms 39, 40 with respect to the direction of the weight force has a recess 44 that is essentially aligned with the fork-shaped opening of the guide arms 39, 40. In the course of the rotational movement illustrated in FIGS. 7 to 10, the fork-like opposing areas of the guide arms 39, 40 are then moved over the guide slot 18 with an alignment extending across the guide slot 18, and, due to their mutual approach, they constrict the area of the bag received between them in the direction of its movement. At the same time, the tapering guide slot 18 causes a narrowing of the bag across the direction of movement.

The closing device 35 is arranged approximately in the upright position illustrated in FIGS. 7 to 10, in which the guide slot 18 has the greatest taper. It has a member 45 that is rotatably mounted between the two outer plates 20, 20' of the outer partial body 16 and which is provided on its outside circumference with radially protruding supporting areas 46, resembling the teeth of a gearwheel, their radially exterior ends 47 being situated on a circle centered around the axis of rotation. These supporting areas 46 protrude into the guide slot 18 in a circumferential section of the rotatably mounted member 45. A section of an adhesive strip 48 is supported on the ends 47 with the side opposite its adhesive side, said strip being supplied from a supply roll 49. The supply roll 49 has a coil core 57 which is rotatably mounted with two radially protruding axle stubs 51 in a recess 52 of the outer partial body 16. The recess 52 is formed by two corresponding recesses in the outer plates 20, 20' of the outer partial body 16, which are opened toward this edge to allow insertion of the supply roll 49 between the two outer plates 20, 20'.

The guide member 53 protrudes into the guide slot 18 and is in contact with the circumferential section of the rotatably mounted member 45, protruding from the other side into the guide slot 18 and thereby together with it forms a passage for the area of the bag 24 guided along the guide slot 18. This guide member is pivotably mounted between the disk-shaped plates 19, 19' of the inner partial body 17.

If the area of the bag 24 that is constricted during its passage through the guide slot 18 is passed between the rotatably mounted member 45 and a guide member 53 due to the rotational movement of the load suspension part 13, the guide disk 22 and the guide member 23, then the adhesive strip 48 with its adhesive side is initially in contact with the constricted area. Furthermore, the latter is forced into the radial recesses 54 bordered between neighboring supporting areas 46 of the rotatably mounted member 45, so that during the passing movement, the adhesive strip 48 is wrapped around the constricted area of the bag 24 on the whole, and finally the free end of the adhesive strip comes to rest adhesively against the area of the adhesive strip supplied from the supply roll 49.

Downstream from the closing device 35, a blade device 56 is arranged on a mounting body 55, which is rotatably mounted between the two outer plates 20, 20' of the outer partial body 16. The mounting body 55 is prestressed by spring elasticity into a position in which the cutting edge 57 of the blade device 56 is retracted between the two plates 20, 20' of the outer partial body. Downstream from the cutting edge 57, the mounting body 55 is provided with an operating arm 58 protruding into the guide slot 18. When the banded area of the bag 24, which is provided with the loop of adhesive strip wrapped around it, comes in contact with the operating arm 58 in the course of its conveyance movement and pivots it thereby, releasing the guide slot 18, the mounting body 55 therefore undergoes a corresponding rotational movement during which the cutting edge moves into the guide slot 18 transversely. In this way, the adhesive strip wrapped around the bag 24 is severed in the area hanging from the supply roll 49, thereby severing the connection between the bag 24 and the supply roll 49. The bag sealed in this way then goes, by way of the rotational position illustrated in FIG. 10, to the end position illustrated in FIG. 7, where it is released by the sealing device 15.

The return of the blade device 56 arranged on the mounting body 55 back into its retracted starting position in the outer partial body 16 is induced by the spring member 59 acting on the mounting body 55, by means of whose spring force the mounting body 55 is pivoted back as soon as the operating arm 58 is released by the bag 24. To avoid a subsequent unwanted vibration of the mounting body 55 about its starting position, a locking member 60 is pivotably mounted in the inner partial body 17, where it is prestressed by means of a spring 61 against the free end protruding into the inner partial body 17. The operating arm 58 runs up against this locking member 60 in its return movement and is thereby braked into its starting position without vibration. Another effect of the locking member 60 is that it presses the two ends of the loop of adhesive strip wrapped around the bag 24 against one another.

The second embodiment illustrated in FIGS. 12 through 14 differs from the first embodiment illustrated in FIGS. 1 through 11 essentially only in that instead of the sealing device 15, which seals the bag 24 with an adhesive strip 48 according to the first embodiment, a sealing device 115 is provided for sealing the bag 24. It has two welding jaws 116, 117 in the form of bars running horizontally in its longitudinal direction, the length of these bars being greater than the greatest width of the bag to be hung from the load suspension part 113. The welding jaws 116, 117 are each attached at their ends to a pair of levers 118, 118' and/or a pair of levers 119, 119', such that the levers 118, 118' and/or 119, 119' of each pair are designed to match one another as seen in the longitudinal direction of the welding jaws 116, 117.

A supporting part 121 that has an essentially a U-shaped cross section and extends horizontally is attached to the upper end of the vertical pillar 3 of the supporting frame for the scales, the two U legs 123, 123' extending vertically upward from the U-shaped web 122 of this cross section. The load cell 104 is arranged between these U legs 123, 123', its fixedly mounted area being clamped securely on the U-shaped web 122 by screw bolts 124, with a spacer 125 inserted between the bottom side of load cell 104 and the top side of the U-shaped web 124. The load suspension part 113 is attached to the load application area of the load cell 104 opposite the fixedly mounted area. It has the shape of a cuboid box extending with its longitudinal direction parallel to the longitudinal direction of the welding jaws 116, 117 and open on the side facing downward. Its rear vertical side wall 126 facing the pillar 3 has a passage in the middle of its longitudinal extent. The load cell 4 with its load application area extends through this passage into the interior of the box-shaped load suspension part 113. Its horizontal top side wall 127 is supported on the top side of the load cell 104 and is secured there by screw bolts 128, 128'.

The side walls 130, 130' of the box-shaped load suspension part 113 that are at a right angle to the rear side wall 126, the upper side wall 127 and the front side wall 129 extending vertically downward from there are bent upward on their lower vertical free end and also taper upward, thereby forming the laterally protruding parts 114 on which the bag (not shown in FIGS. 12 to 14) is suspended.

A U-shaped section 131 extending with its longitudinal direction parallel to the longitudinal direction of the load suspension part 113 is mounted in an area situated between the rear side wall 126 of the load suspension part 113 and the vertical pillar 3 on the underside of the U-shaped web 122 of the supporting part 121. Each of the two longitudinal ends has a bracket 132, 132' attached to it at a right angle to the longitudinal direction. The ends of a shaft 133 extending in the longitudinal direction of the load suspension part 113 are rotatably mounted in the end areas of these brackets 132, 132' pointing toward the pillar 3. An electric motor 135 that is flange-mounted on a vertical carrying plate 134 attached to the U leg 123' of the supporting part 121 drives a toothed belt pulley 137 to rotate by means of a toothed belt 136, the toothed belt pulley being arranged in a rotationally fixed mount on the shaft 133.

Close to their ends mounted in the brackets 132, 132', the ends of the levers 118, 118' opposite the welding jaws 116 are connected to the shaft 133 in a rotationally fixed mount. At a horizontal distance from this, the ends of the levers 119, 119' opposite the welding jaws 117 are mounted rotatably in the opposite ends of the brackets 132, 132'. Furthermore, the levers 118, 119 and/or 118', 119' are each interconnected by a coupling element 138, 138', such that the articulation points 139, 140 of these coupling elements on the respective levers are spaced a distance apart from the articulation points of the levers on the brackets 132, 132'.

Due to the lever gear designed in this way, the rotation of the shaft 133 driven by the electric motor 135 produces a pivoting movement of the lever pairs 117, 118 and/or 117', 118' closed from the open position shown in FIG. 13 into the welding position shown in FIGS. 12 and 14. In the open position the load suspension part 113 is freely accessible in the limited space between the welding jaws 116, 117 and therefore allows the bag to be hung from the two laterally protruding parts 114. In the transition to the welding position, the levers 118, 119 and/or 118', 119' are pivoted toward one another and downward until the bag is clamped between the welding jaws 116, 117 and is welded by an input of heating current. The reference numerals 141, 141' denote connecting terminals for the supply of heating current to the welding jaw 117. In the embodiment illustrated here, the other welding jaw 116 is unheated and serves only as an abutment for support against the welding pressure exerted by the heated welding jaw 117. Alternatively, both welding jaws 116, 117 may also be designed as heated welding jaws.

The camera 142, which is aimed at the weighable goods placed in the suspended bag in the manner explained in the first embodiment, is also discernible in FIGS. 13 and 14.

| List of reference numerals | |
|---|---|
| 1, 2 | Leg |
| 3 | Vertical pillar |
| 4 | Load cell |
| 4a | Screw bolt |
| 4b | Clamping plate |
| 5 | Section of a supporting profile |
| 5a | Flange section |
| 6 | Tubular body |
| 6a | Central axis |
| 7 | Pulley |
| 8 | Drive belt |
| 8a | Pulley |
| 9 | Electric motor |
| 10 | Staple |
| 11 | Horizontal pivot axis |
| 12 | Staple |
| 13 | Tubular load suspension part |
| 14, 14' | Protruding parts |
| 15 | Sealing device |
| 16 | Outer partial body |
| 17 | Inner partial body |
| 18 | Guide slot |
| 19, 19' | Circular disk-shaped plates |
| 20, 20' | Outer plates |
| 21 | Fastening section |
| 22 | Guide disk |
| 23 | Guide member |
| 24 | Bag |
| 25 | Filling opening |
| 26 | Receiving opening |
| 27 | Carrying straps |
| 28 | Control and analyzing unit |

-continued

| List of reference numerals | |
|---|---|
| 29 | Line |
| 30 | Visual display device |
| 31 | Section of an adhesive strip |
| 32 | Label printer |
| 33 | Outer circumferential edge |
| 34 | Open inlet end |
| 35 | Closing device |
| 36 | Open outlet end |
| 37 | Edge |
| 38 | Edge |
| 39, 40 | Guide arms |
| 41 | Rotation point |
| 42, 43 | Cam disk |
| 44 | Recess |
| 45 | Rotatably mounted member |
| 46 | Supporting areas |
| 47 | Ends |
| 48 | Adhesive strip |
| 49 | Supply roll |
| 50 | Winding core |
| 51 | Axle stubs |
| 52 | Recess |
| 53 | Guide member |
| 54 | Recesses |
| 55 | Supporting body |
| 56 | Blade device |
| 57 | Cutting edge |
| 58 | Operating arm |
| 59 | Spring member |
| 60 | Locking member |
| 61 | Spring |
| 104 | Load cell |
| 113 | Load suspension part |
| 114 | Protruding part |
| 115 | Sealing device |
| 116, 117 | Welding jaws |
| 118, 118' | Lever |
| 119, 119' | Lever |
| 120 | Lever gear |
| 121 | Supporting part |
| 122 | U-shaped web |
| 123, 123' | U leg |
| 124 | Screw bolt |
| 125 | Spacer |
| 126 | Rear side wall |
| 127 | Top side wall |
| 128, 128' | Screw bolts |
| 129 | Front side wall |
| 130, 130' | End walls |
| 131 | U section |
| 132, 132' | Bracket |
| 133 | Shaft |
| 134 | Supporting plate |
| 135 | Electric motor |
| 136 | Toothed belt |
| 137 | Belt pulley |
| 138, 138' | Coupling element |
| 139, 140 | Articulation points |
| 141, 141' | Connecting clamps |
| 142 | Camera |

The invention claimed is:

1. A method for weighing weighable goods that are placed in a bag having a filling opening, by means of scales having a load suspension part to receive the weight force acting on the weighable goods and transmitted to a load cell that forms a weight value corresponding to the weight force, wherein the bag is appended to the load suspension part by an area of the bag adjacent to the filling opening, and the weight force is thereby transmitted to the load suspension part, wherein the bag hanging from the load suspension part is held open by the load suspension part such that an imaging beam path of an image recording device can be directed at the weighable goods placed in the bag unobstructed by the bag, and wherein the bag is gripped, sealed and released again by a sealing device in an empty area of the bag situated between its area hanging from the load suspension part and an area containing the weighable goods, wherein a label is printed whereon a weight value formed after sealing the bag is contained.

2. The method according to claim 1, wherein the area of the bag inserted into the sealing device is constricted by the sealing device.

3. The method according to claim 1, wherein the area of the bag inserted into the sealing device is welded by the sealing device.

4. The method according to claim 1, wherein the area of the bag inserted into the sealing device is banded by the sealing device.

5. The method according to claim 1, wherein the area of the bag inserted into the sealing device is stapled by the sealing device.

6. The method according to claim 1, wherein the sealing device is operated in response to an external command.

7. The method according to claim 1, wherein the weighable goods placed in the bag are automatically identified by means of image recognition software on the basis of the image created by the image recording device.

8. The method according to claim 1, wherein further comprising printing a label on a seal of the bag.

9. The method according to claim 1, further comprising automatically applying the label to the bag.

10. The method according to any one of claim 1, further comprising printing the weight value on the bag.

11. A scale having a load suspension part to receive a weight force acting on weighable goods that have been placed in a bag having a filling opening and transferring the weight force to a load cell, forming a weight value according to the weight force, wherein the load suspension part has a device by means of which the bag can be appended to the load suspension part by an area of the bag adjacent to the filling opening, and the weight force can be thereby transferred via the bag to the load suspension part, wherein the bag hanging from the load suspension part is held open by the load suspension part such that an imaging beam path of an image recording device can be directed at the weighable goods placed in the bag unobstructed by the bag, wherein a sealing device is provided, sealing the bag in an empty area of the bag situated between the area of the bag hanging from the load suspension part and an area of the bag containing the weighable goods, wherein the scales comprise a label printer controlled to print on a label a weight value formed after sealing.

12. The scales according to claim 11, wherein the device has at least one part extending across the direction of weight force for reaching into a receiving opening formed in the area of the bag adjacent to the filling opening.

13. The scales according to claim 12, wherein two of the protruding parts are provided on opposite locations of the load suspension part across the direction of the weight force.

14. The scales according to claim 11, wherein
the sealing device has a guide slot extending between an open inlet end and an open outlet end in the direction of weight force beneath the load suspension part;
the empty area of the bag hanging from the load suspension part can be inserted into said guide slot from the inlet end and can be guided to its outlet end by a relative movement between the load suspension part and the guide slot; and
the scales further comprise a closing device engaging in the guide slot arranged upstream from the outlet end, such that the empty area of the bag which passes by it can be provided with a closure means by means of said closing device.

15. The scales according to claim 14, further comprising a drive device configured to drive the relative movement is provided.

16. The scales according to claim 15, wherein the load suspension part can be moved by the drive device along a path of movement following the guide slot.

17. The scales according to claim 14, wherein the guide slot tapers from its inlet end to its outlet end, and the closing device is arranged in the tapered area.

18. The scales according to claim 14, wherein the closing device has a guide element, which is provided with two fork-like opposing guide arms, said guide arms being movable from a receiving position outside of the guide slot, at which the empty area of the bag hanging from the load suspension part can be inserted between the guide arms from their free end, to the inlet end of the guide slot and with guide arms extending across the latter along a path of movement following the guide slot up to its outlet end as far as a removal site situated outside of the guide slot.

19. The scales according to claim 18, wherein the guide arms can be approached to one another during their movement from the inlet end to the outlet end of the guide slot.

20. The scales according to claim 19, wherein the approach is controlled by a control cam arrangement with which the guide arms are engaged.

21. The scales according to claim 14, wherein
the closing device is provided with a rotatably mounted member having a circumferential section that protrudes into it from one side of the guide slot; and
the scales further comprise a section of an adhesive strip having an adhesive side and forming the closure means can be supported on said circumferential section, and with its side opposite the adhesive side, and is provided with a guide member that is aimed from the other side of the guide slot toward the circumferential section of the rotatably mounted member and together with the circumferential section forms a passage for the area of the bag that is guided along the guide slot.

22. The scales according to claim 21, wherein the guide member is elastically stressed against the rotatably mounted member.

23. The scales according to claim 21, wherein the rotatably mounted member has radially protruding supporting areas on its outer circumference spaced a distance apart from one another in the circumferential direction, the section of the adhesive strip being supportable on their radially outer ends situated on a circle centered about the axis of rotation and by means of which the recesses that are recessed radially between neighboring supporting areas are bordered.

24. The scales according to claim 21, wherein the closing device has a receptacle for rotatable support of a supply roll containing the adhesive strip.

25. The scales according to claim 24, wherein the receptacle is formed by a recess formed in a base body of the closing device which borders the guide slot, said recess being opened toward the edge of the base body and being receivable in a form-fitting manner in the axle stubs of a winding core of the supply roll.

26. The scales according to claim 21, wherein the sealing device has a blade device whose cutting edge can be induced to execute a cutting movement across the guide slot with respect to the guide direction of the bag downstream from the closing device.

27. The scales according to claim 26, wherein the blade device is provided on a rotatably mounted mounting body that has an operating arm protruding into the guide slot from which a rotation of the mounting body that drives the cutting movement of the cutting edge from a starting position, situated on one side outside of the guide slot, to an end position situated on the other side outside of the guide slot, can be executed by a force acting in the guidance direction of the bag.

28. The scales according to claim 27, wherein the supporting body is configured to be acted upon by a spring member driving a reversing movement of the cutting edge opposite the cutting movement.

29. The scales according to claim 28, wherein the supporting body is configured to be acted upon by a locking member that brakes it in the reversing movement into the starting position of the cutting edge.

30. The scales according to claim 14, wherein the path of movement of the load suspension part is a circular path and the guide slot is bordered by curve segments adapted to this circular path.

31. The scales according to claim 14, wherein the load suspension part is pivotable about an axle at a right angle to the direction of the weight force.

32. The scales according to claim 11, wherein the closing device has two welding jaws which can be moved between an open position in which the bag can be suspended from the load suspension part and a welding position in which the empty area of the bag suspended from the load suspension part can be clamped between the welding jaws for the welding operation.

33. The scales according to claim 32, wherein the welding jaws are arranged on levers of a lever gear which serves its movement between the open position and the closed position said gear being supported on a foundation frame for the scales.

34. The scales according to claim 32, wherein the lever gear has a shaft drivable to rotate by an electric motor with which one of the levers is connected in a rotationally fixed manner.

35. The scales according to claim 32, wherein the lever gear has a coupling element which has an articulated connection to articulation points spaced a distance apart from the lever fulcra of the levers provided with the welding jaws.

36. The scales according to claim 11, wherein the load suspension part is supported on a movable parallelogram leg of a parallelogram guide attached to a parallelogram leg on a foundation frame of scales opposite thereto.

37. The scales according to claim 11, wherein an image recording device is provided, having an imaging beam path which is unobstructed by the bag and is directed at the weighable goods placed in the bag due to its spatial arrangement relative to the filling opening of the bag hanging from the load suspension part, said filling opening being held open by the load suspension part.

38. The scales according to claim 37, wherein an image recognition devices which automatically identifies the weighable goods placed in the bag on the basis of the image generated by the image recording device is provided.

39. The scales according to claim 37, wherein the image recording lens of the image recording device is arranged on the load recording part.

40. The scales according to claim 39, wherein the load suspension part has a hollow area in which the image recording lens is situated and which protrudes with an opening that serves to provide a passage for the imaging beam path through the filling opening into the bag hanging from the load suspension part.

41. The scales according to claim 37, wherein an illumination device directed at the weighable goods placed in the bag hanging from the load suspension part is provided.

* * * * *